(12) United States Patent
Pasternak

(10) Patent No.: US 8,850,396 B2
(45) Date of Patent: Sep. 30, 2014

(54) PERFORMING SOFTWARE TESTING BASED ON GROUPING OF TESTS USING TEST LIST ENTITY

(75) Inventor: Michael Pasternak, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 490 days.

(21) Appl. No.: 12/789,248

(22) Filed: May 27, 2010

(65) Prior Publication Data

US 2011/0296384 A1 Dec. 1, 2011

(51) Int. Cl.
*G06F 9/44* (2006.01)
*G06F 11/36* (2006.01)

(52) U.S. Cl.
CPC .................. *G06F 11/3688* (2013.01)
USPC .............. 717/124; 717/127; 717/131; 714/25

(58) Field of Classification Search
None
See application file for complete search history.

(56) References Cited

U.S. PATENT DOCUMENTS

| | | | |
|---|---|---|---|
| 6,931,627 B2 * | 8/2005 | Arbouzov et al. | ............ 717/124 |
| 7,127,641 B1 | 10/2006 | Anderson | |
| 7,367,025 B1 | 4/2008 | Nikolov et al. | |
| 7,398,469 B2 * | 7/2008 | Kisamore et al. | ............ 715/704 |
| 7,594,219 B2 | 9/2009 | Ramachandran et al. | |
| 7,610,578 B1 * | 10/2009 | Taillefer et al. | ............... 717/124 |
| 7,613,953 B2 | 11/2009 | Voruganti | |
| 7,890,806 B2 | 2/2011 | Kwong et al. | |
| 7,937,622 B2 * | 5/2011 | Mehrotra | ........................ 714/25 |
| 7,937,625 B2 | 5/2011 | Calinoiu et al. | |
| 8,276,123 B1 | 9/2012 | Deng et al. | |
| 8,276,126 B2 | 9/2012 | Farnham et al. | |
| 8,296,734 B2 | 10/2012 | Geppert et al. | |
| 2004/0015870 A1 * | 1/2004 | Arbouzov et al. | ............ 717/126 |
| 2004/0046787 A1 | 3/2004 | Henry et al. | |
| 2004/0133881 A1 | 7/2004 | Chamberlain et al. | |
| 2005/0071818 A1 * | 3/2005 | Reissman et al. | ............ 717/127 |
| 2005/0204343 A1 * | 9/2005 | Kisamore et al. | ............ 717/124 |
| 2005/0273490 A1 | 12/2005 | Shrivastava et al. | |
| 2006/0041864 A1 | 2/2006 | Holloway et al. | |
| 2006/0150188 A1 | 7/2006 | Roman et al. | |

(Continued)

OTHER PUBLICATIONS

Grindal, M., Evaluation of Combination Strategies for Practical Testing, Technical Report HS-IKI-TR-04-003, Jun. 23, 2004, 62 pages, [retrieved on May 30, 2014], Retrieved from the Internet: <URL:http://www.diva-portal.org/smash/record.jsf?pid=diva2: 2400>.*

(Continued)

*Primary Examiner* — Thuy Dao
*Assistant Examiner* — Geoffrey St Leger
(74) *Attorney, Agent, or Firm* — Lowenstein Sandler LLP

(57) ABSTRACT

A mechanism for performing dynamic software testing on a computer system based on grouping of tests using a test list entity. A method of embodiments of the invention includes causing execution a first group of first tests based on a first set of configuration settings, and executing the first group includes enabling a test execution script to run the first tests according to the first set of configuration settings, and the test execution script is hosted at a test execution platform of a computer system. The method further includes facilitating creation, in runtime, a second group of second tests based on a second set of configuration settings that is different from the first set of configuration settings, and causing execution, in runtime, the second group of second tests, and executing the second group includes enabling the test execution script to run the second tests according to the second set of configuration settings.

14 Claims, 11 Drawing Sheets

(56) References Cited

U.S. PATENT DOCUMENTS

| | | | |
|---|---|---|---|
| 2007/0162894 A1* | 7/2007 | Noller et al. | 717/124 |
| 2008/0040706 A1 | 2/2008 | Blancha et al. | |
| 2008/0109790 A1 | 5/2008 | Farnham et al. | |
| 2008/0127101 A1 | 5/2008 | Anafi et al. | |
| 2008/0209413 A1 | 8/2008 | Nakumani et al. | |
| 2008/0222454 A1 | 9/2008 | Kelso | |
| 2008/0256517 A1* | 10/2008 | Atkin et al. | 717/124 |
| 2008/0270998 A1* | 10/2008 | Zambrana | 717/131 |
| 2008/0306752 A1 | 12/2008 | Wagner et al. | |
| 2009/0199160 A1* | 8/2009 | Vaitheeswaran et al. | 717/124 |
| 2011/0258600 A1* | 10/2011 | Osenkov et al. | 717/124 |

OTHER PUBLICATIONS

Rose, L., Getting the Most Out of an Automated Test Tool, Rational Software Whitepaper, 1997, 12 pages, [retrieved on May 30, 2014], Retrieved from the Internet: <URL:http://rtsys.informatik.uni-kiel.de/teaching/ss03/s-rtcode/papers/II_rose.pdf>.*

USPTO, Office Action for U.S. Appl. No. 12/789,199 mailed on Oct. 11, 2012.

USPTO, Final Office Action for U.S. Appl. No. 12/789,199 mailed on Jan. 29, 2013.

USPTO, Office Action for U.S. Appl. No. 12/789,199 mailed Mar. 28, 2014.

USPTO, Office Action for U.S. Appl. No. 12/789,228 mailed on Feb. 12, 2013.

USPTO, Final Office Action for U.S. Appl. No. 12/789,228 mailed Aug. 13, 2013.

USPTO, Notice of Allowance for U.S. Appl. No. 12/789,228 mailed Nov. 12, 2013.

U.S. Appl. No. 11/388,445, Probabilistic System for Identifying Software Development Regressions, Filed on Mar. 24, 2006, 21 pages.

Lucia et al. Recovering Traceability Links in Software Artifact Management Systems using Information Retrieval Methods. ACM Transactions on Software Engineering and Methodology (TOSEM), vol. 16, Issue 4, Sep. 2007. Retrieved on [Oct. 28, 2013], Retrieved from the Internet: URL <http://dl.acm.org/citation.cfm?id=1276934>.

Canfora et al. Fine Grained Indexingof Software Repositories to Support Impact Analysis. Proceedings of the 2006 international workshop on Mining software repositories, 2006, pp. 105-111, Retrieved on [Oct. 28, 2013] Retrieved from the Internet: URL<http://dl.acm.org/citation.cfm?id=1138009>.

* cited by examiner

Creating test list by 'Create-TestsList' cmdlet:   ⟵ 388

$List = Create-TestsList -ListName "Benchmark_Windows"

Adding tests to List(with or without RunOnce configuration)   ⟵ 390

1. $Tests1= Select-Test -Name KSM_Migrate
2. $Tests2= Select-Test -Name Benchmark_SysMark
3. $FiewTestsArray =($Tests1,Tests2)
4. $List = Create-TestsList -ListName "Benchmark_Windows"
5. $List.Add($FiewTestsArray)

or   ⟵ 392

1. $Tests1= Select-Test -Name KSM_Migrate
2. $List = Crate-TstsList -ListName "Benchmark_Windows"
3. $TestConf = $Tests1.GetConfiguration()
4. Modify '$TestConf.QtmsConfiguration' as needed
5. $List.Add($Tests1,$TestConf)...

FIG. 3B

Executing List (List as any test object supports following Run methods)   / 394

```
bool Run(string setup, string os);
bool Run(string setup, string os, string build);
bool Run(string setup, string os, Test.DataCenter DataCenter);
bool Run(string setup, string os, Test.DataCenter DataCenter, int Cluster);

Example:

$List.Run("silver","winxp-32-sysmrk")
```

Retrieving TestResults by List with 'Get-TestResultsByList' cmdlet   / 396

```
Get-TestResultsByList -ListName "Benchmark_Windows"

Id                  : 39345
TestId              : 113
Active              : True
Name                : Some_Benchmark_v1
BaseTestName        : Some_Benchmark
ScriptName          : Some_Benchmark
ScriptLocation      : \\server\script_location
StartTime           : 10/11/2009 9:54:38 AM
EndTime             : 1/1/0001 12:00:00 AM
Status              : Failed
RunListId           : 9835
ServerId            : 1
Iterations          : 7
ResultFile          :
TestParams          : conf_param1=x, conf_param2=y, conf_param3=z...
Build               : sp212
Revision            : 37344
Version             : 2.1
LogDir              :
/logs/blue/Some_Benchmark_10_11_2009_10_16_09/consoleLog_Some_Benchmark_v1
_blue_10_11_2009_10_16
DbStat              : 512
ExecutionInformation : RedHat.Automation.Framework.ExecutionInfo
AncestorId          : -1
```

```
Id                  : 28053
TestId              : 82
Active              : True
Name                : Some_Benchmark_v1
BaseTestName        : Some_Benchmark
ScriptName          : Some_Benchmark
ScriptLocation      : \\server\script_location
StartTime           : 7/22/2009 8:04:26 PM
EndTime             : 7/22/2009 8:05:44 PM
Status              : Passed
RunListId           : -1
ServerId            : 1
Iterations          : 1
ResultFile          :
TestParams          : conf_param1=x, conf_param2=y, conf_param3=z...

Build               : sp173
Revision            : 32587
Version             : 2.1
LogDir              :
/logs/blue/Some_Benchmark_07_22_2009_14_41_26/Some_Benchmark_blue_7_22_2009_
7_23_25_PM.zip
DbStat              : 256
ExecutionInformation : RedHat.Automation.Framework.ExecutionInfo
AncestorId          : -1

Id                  : 39346
TestId              : 125
Active              : True
Name                : Some_Benchmark_v1
BaseTestName        : Some_Benchmark
ScriptName          : Some_Benchmark
ScriptLocation      : \\server\script_location
StartTime           : 10/10/2009 6:21:41 PM
EndTime             : 10/11/2009 7:33:22 AM
Status              : Passed
RunListId           : 9835
ServerId            : 1
Iterations          : 3
ResultFile          :
TestParams          : conf_param1=x, conf_param2=y, conf_param3=z...
```

```
Build              : sp212
Revision           : 37344
Version            : 2.1
LogDir             :
/logs/blue/Some_Benchmark_10_10_2009_18_43_12Some_Benchmark_blue_10_11_2009_
7_56_40_AM.zip
DbStat             : 512
ExecutionInformation : RedHat.Automation.Framework.ExecutionInfo
AncestorId         : -1

Id                 : 39345
TestId             : 35
Active             : True
Name               : Some_Benchmark_v1
BaseTestName       : Some_Benchmark
ScriptName         : Some_Benchmark
ScriptLocation     : \\server\script_location
StartTime          : 10/10/2009 5:03:48 PM
EndTime            : 10/10/2009 6:11:55 PM
Status             : Passed
RunListId          : 9835
ServerId           : 1
Iterations         : 7
ResultFile         :
TestParams         : conf_param1=x, conf_param2=y, conf_param3=z...

Build
Revision           : sp212
Version            : 37344
LogDir             : 2.1
/logs/blue/Some_Benchmark_10_10_2009_17_25_14/Some_Benchmark_blue_10_10_2009_
6_35_17_PM.zip
DbStat             : 512
ExecutionInformation : RedHat.Automation.Framework.ExecutionInfo
AncestorId         : -1
.
.
.
```

FIG. 3B (cont.)

Retrieving Tests From List with 'Get-TestsByList' cmdlet
398

```
Get-TestsByList -ListName "Benchmark_Windows"

Id              : 113
Active          : True
Name            : Some_Benchmark_v1
BaseTestName    : Some_Benchmark
ScriptName      : Some_Benchmark
ScriptLocation  : \\server\script_location Id              : 82
Active          : True
Name            : Some_Benchmark_v1
BaseTestName    : Some_Benchmark
ScriptName      : Some_Benchmark
ScriptLocation  : \\server\script_location Id              : 125
Active          : True
Name            : Some_Benchmark_v1
BaseTestName    : Some_Benchmark
ScriptName      : Some_Benchmark
ScriptLocation  : \\server\script_location
```

FIG. 3B (cont.)

PERFORMING SOFTWARE TESTING BASED ON GROUPING OF TESTS USING TEST LIST ENTITY

RELATED APPLICATIONS

The present application is related to co-filed U.S. patent application Ser. No. 12/789,199 entitled "Mechanism for Dynamic Software Testing Using Test Entity" and U.S. patent application Ser. No. 12/789,228 entitled "Mechanism for Performing Dynamic Software Testing Based on Test Result Information Retrieved in Runtime Using Test Result Entity", which are assigned to the assignee of the present application.

TECHNICAL FIELD

The embodiments of the invention relate generally to software testing and, more specifically, relate to performing dynamic software testing based on grouping of tests using a test list entity.

BACKGROUND

It is commonly known that administrative tasks include software testing various entities (e.g., software components, network protocols, etc.) using various script executing platforms (e.g., Windows PowerShell® platform) that use test execution scripts (e.g., PowerShell script) and are powered by extensible automated engines, such as PowerShell® invocation engine (e.g., System.Management.Automation.dll), and software frameworks (e.g., .NET framework). However, complications occur when testing is to be performed based on various (software and/or hardware) configuration settings, and the testing process becomes even more convoluted, and even unmanageable, when one or more configuration settings are to be modified. This is because today's testing solutions require testing team members (e.g., software developers) to build a test execution platform or infrastructure with multiple rules/regulations and configuration setting variants to accommodate each test and its corresponding hardware and software configuration settings, separately and independently, which, at best, requires constant supervision and rerunning of failed tests and, at worst, becomes overly complex and unmanageable.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 3B illustrates a transaction sequence for performing dynamic software testing based on grouping of tests using a test list entity according to one embodiment of the invention;

DETAILED DESCRIPTION

Embodiments of the invention provide for performing dynamic software testing based on grouping of tests using a test list entity. A method of embodiments of the invention includes causing execution of a first group of first tests based on a first set of configuration settings, and executing the first group includes enabling a test execution script to run the first tests according to the first set of configuration settings, and the test execution script is hosted at a test execution platform of a computer system. The method further includes facilitating creation, in runtime, of a second group of second tests based on a second set of configuration settings that is different from the first set of configuration settings, and causing execution, in runtime, the second group of second tests, and executing the second group includes enabling the test execution script to run the second tests according to the second set of configuration settings.

The embodiments of the present invention are used to provide dynamic software testing that is based on groups of tests using a test list entity. A number of groups may be created with each group having a number of software tests based on any number of hardware or software configuration settings. Using the test list entity, an entire group of tests (or even multiple groups, simultaneously) can be executed. When a group of tests is executed, the test list entity enables a test execution script to run the grouped tests according to their corresponding properties and configuration settings. Test list entity provides the test execution script the necessary ability to seamlessly continue to detect various configuration settings and adjust and behave accordingly. These groups of tests may be predetermined or created during runtime. This group-based testing technique keeps software testing dynamic and efficient and capable of being performed on a single testing platform or infrastructure that is simple and manageable. In other words, this efficient use of grouping of tests eliminates the need for creating labor-intensive, complex, and unmanageable test execution infrastructure so that each test is individually run.

Figure 1:
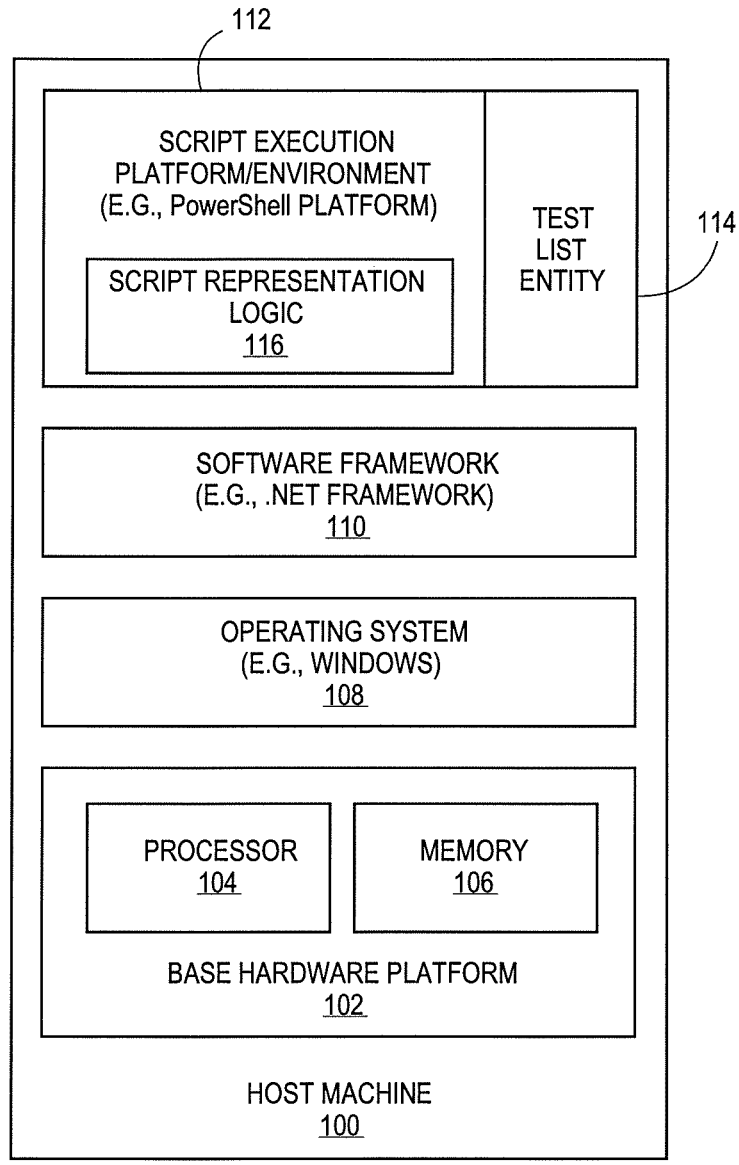
FIG. 1 illustrates a host machine for employing a test list entity enabling a test execution script at a script execution platform to dynamically run software tests in groups according to one embodiment of the invention.

FIG. 1 is a block diagram of a host machine 100 for employing a test list entity 114 enabling a test execution script at a script execution platform to dynamically run software tests in groups according to one embodiment of the invention. Host machine 100 includes a base hardware platform 102 that comprises a computing platform, which may be capable, for example, of working with a standard operating system 108 (e.g., Microsoft® Windows®, Linux®, etc.). Operating system 108 serves as an interface between hardware or physical resources of the host machine 100 and a software framework 110 (e.g., Microsoft .NET® Framework). In some embodiments, base hardware platform 102 may include a processor 104, memory devices 106, network devices, drivers, and so on. Host machine 100 includes a server computer system and/or a client computer system (e.g., a client device).

Software framework 110 may provide features (e.g., user interface, database connectivity, network communication, etc.) allowing to address common programming problems and a virtual machine to manage the execution of software programs written for the software framework 110. Script execution platform or environment 112 (e.g., Windows® PowerShell®) supports a test execution script (e.g., PowerShell® script) and is built on software framework 110. Script execution platform 112 may include an extensible automation engine that includes a command-line shell and a corresponding test execution scripting language, such as PowerShell script. As aforementioned, script execution platform 112 is built on software framework 110 to provide an environment for the user (e.g., software developers/administrators) to perform local and remote administrative tasks (including software testing). Using the PowerShell script as a test execution script, these administrative tasks may be performed by execution of command-lets ("cmdlets") that are specialized classes (e.g., .NET classes) implementing a particular operation and are combined using scripts, which are composition of cmdlets and imperative logic, standalone applications, or by instantiating regular classes. For brevity and simplicity, PowerShell platform, PowerShell Script, .NET Framework, and Microsoft Windows are used as examples throughout this document.

Script execution platform 112 provides a hosting mechanism for the execution script that can be used by a user to produce and run software tests. For example, when testing a software component, the user defines certain properties (e.g., rules, regulations, script behavior, testing time limit, etc.) and software and/or hardware configuration settings relating to the test by inserting such properties and settings in the execution script prior to running the test. The user then initiates the test and the execution script runs the test according to the defined properties and configuration settings. In one embodiment, script representation logic 116 of script execution platform 112 provides logical script representation of testing (e.g., test scripts, test results, test history, hardware and/or software configuration information (both to be viewed and modified), etc.) shown as an example with reference to FIG. 3B. The user further uses the logical script representation to perform certain administrative tasks, such as amending test scripts, starting or stopping tests, modifying configuration settings, viewing and analyzing results, etc. In one embodiment, some or all of the testing information may be provided and the aforementioned administrative tasks can be performed using a Graphical User Interface (GUI)-based representation. Test list entity 114 may serve as a database interface to access a database coupled to the host machine 100 for relevant testing information (e.g., test scripts, test results, test history, test statistics (such as pass/fail percentage) based on test history), and serve as a user interface to, in communication with script representation logic 116, provide access to logical script representation (as shown in FIG. 3B) or through a GUI-based representation.

Test list entity 114, in one embodiment, facilitates listing or grouping of any number of software tests of different corresponding configuration settings. These grouping can be predetermined and done prior to running tests or determined and performed in runtime. For example, the runtime grouping of tests may be performed by a user in response to analysis or comparison of the results of various tests in runtime such as while one or more tests being run by the execution script. Test list entity 114 enables the execution script to execute these groups of tests by running the grouped tests according to their corresponding properties and configuration settings. To maximize test coverage, a group of tests may include multiple tests to be run on multiple hardware or software configuration settings and this context of the group may be defined by the tests themselves based on their predefined execution policies and preference or previous test execution results (on different platforms and product versions). This runtime grouping of tests and their execution using a single script execution platform 112 and its execution script as enabled by test list entity 114 eliminates the need for building separate, complex, and unmanageable testing infrastructures for running of these tests and their configuration settings.

Test list entity 114 further enables test execution script being hosted at script execution platform 112 to run and rerun various tests based on changing configuration settings (e.g., software or hardware configuration settings) in runtime. Test list entity 114 enables the test execution script to define itself, adjust itself, and decide its own behavior based on runtime-modification of hardware and/or software configuration settings relating to various tests. Test list entity 114, in one embodiment, uses a single configuration variant (as opposed to requiring a separate one for each test and/or hardware/software configuration setting) having the ability to dynamically adjust, in runtime, according to various test properties and the changing configuration settings. Test list entity 114 enables the test execution script to make decisions on how a test is to be executed by it so that the testing infrastructure may remain simplified and manageable (e.g., the execution script limits itself in focusing on the available resources to satisfy the current resting requirements). Test list entity 114 may provide an additional ability to, automatically, create test replications and run them with changing hardware/software configuration settings, in runtime, to provide the ability to compare results of different tests on multiple hardware/software configuration settings.

Throughout this document, the term "in runtime" at least refers to performing a task (e.g., modifying hardware or configuration settings, running or rerunning a test according to the modified configuration setting, accessing and obtaining test result information from a database, enabling an execution script at the script execution platform 112 to run/rerun a test based on the obtained test information, etc.) without pausing or stopping the testing system, such as without having to stop the execution script from running one or more tests that the execution script is in the process of running or build a complex text infrastructure to accommodate a modified configuration settings, or the like.

Figure 2A:
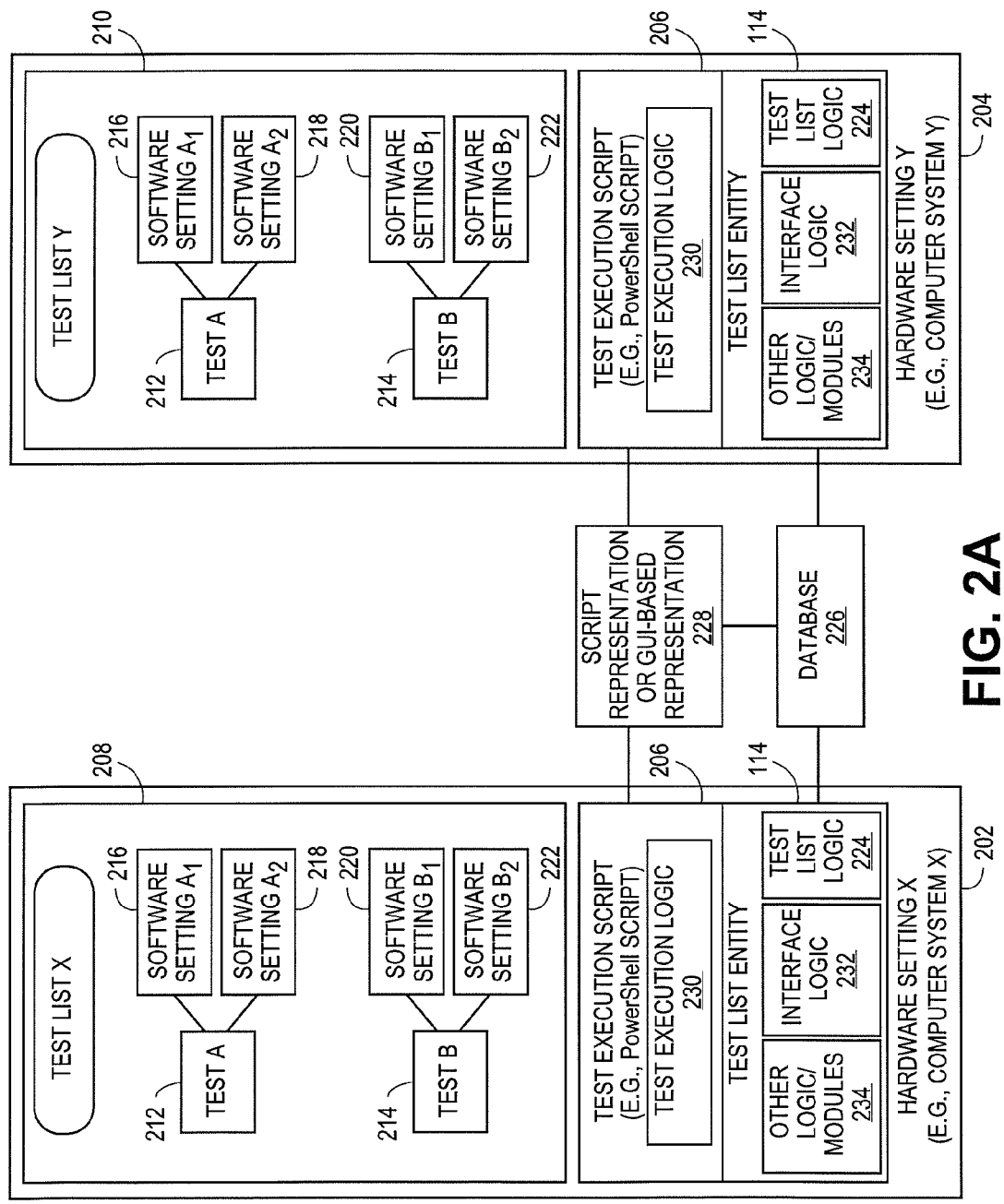
FIG. 2A illustrates a transaction sequence for performing dynamic software testing based on grouping of tests using a test list entity according to one embodiment of the invention.

FIG. 2A illustrates a transaction sequence for performing dynamic software testing based on grouping of tests using a test list entity 114 according to one embodiment of the invention. As an initial matter, the words "group" and "list" are used interchangeably throughout this document. In the illustrated embodiment, a user wishes to run two tests, test A 212 and test B 214, to test a network protocol. However, each of the two tests A 212 and B 214 is to be run based on two different software configuration settings A1 216, A2 218 and B1 220, B2 222, respectively. Further, both tests A-B 212-214 are to be run on two different hardware configuration settings X 202 and Y 204. Two test groups, test group X 208 and test group Y 210, are formed either as predetermined or formed during runtime. Test group X 208 includes tests A 212 and B 214 with their corresponding software configuration settings A1-A2 216-218 and B1-B2 220-222, respectively, and hardware configuration setting X 202. Similarly, test group Y 210 includes the same two tests A-B 212-214 and their corresponding software configuration settings A1-A2 216-218 and B1-B2 220-222, but a different hardware setting Y 204.

In one embodiment, to run the two tests 212-214 on hardware configuration setting 202, the user merely types in one or more command lines using a script representation 228 (or click on an icon (e.g., Test List X) using a GUI-based representation) to run the first group of tests A-B 212-214 on all their software configuration settings A1-A2 216-218, B1-B2

220-222 on hardware configuration setting X 202. Upon the user's initiation of the running of test group X 208, test list entity 114 enables test execution script 206 (e.g., PowerShell script) by, for example, having test entity of other logic/modules 234 referencing test execution logic 230 of test execution script 206 to run tests A-B 212-214 and dynamically accommodate, in runtime, the four different software configuration settings A1-A2 216-218, B1-B2 220-222 associated with tests A-B 212-214 running on hardware configuration setting X 202.

In one embodiment, a user, using command lines in script representation 228, generates groups of tests A-B 212-214, such as test list X 208 and Y 210, while test list logic 224 of test list entity 114 facilitates and recognizes the user's grouping of tests A-B 212-214 into test list X 208 and test list Y 210, and references test entity invocation logic (also referred to as "test logic" or "test invocation logic") of other logic/modules 234 which further references test execution logic 230 to run tests A-B 212-214 in groups as defined and initiated by the user. For example, when the user initiates the execution of test list X 208, the test entity invocation logic of other logic/modules 234, in working with test list logic 224, dictates software configuration settings A1-A2 216-218, B1-B2 220-222 and hardware configuration setting X 202 for tests A-B 212-214 to the test execution logic 230 through command-line arguments or configuration objects. Test execution logic 230 executes test list X 208 by running the two tests A-B 212-214 based on various configuration settings 216-222, consecutively or concurrently in any combination by, for example, separate threads (e.g., virtual machines) as defined by the user. The user may use script representation (or GUI-based representation) 228 to perform various tasks, such as generating and initiating execution of test lists X-Y 208-210, using it as command-line interface to generate command-line arguments, modify existing and/or generate new hardware and/or software configuration settings, view and analyze results of test lists X-Y 208-210 and/or previously-run tests that can be accessed and retrieved from database 226, and the like.

With the grouping of tests A-B 212-214 into test list X-Y 208-210, using test list entity 114, instead of initiating the execution of the two tests A-B 212-214 four times (once for each software configuration setting 216-222), the user merely types in one or more command lines using script representation 228 or clicks, once, on an icon (e.g., Test List X) representing the two tests A-B 212-214 and its four software configuration settings A1-A2 216-218, B1-B2 220-222 and hardware configuration setting X 202. Similarly, the user then initiates the same two tests A-B 212-214 with the same four software configuration settings A1-A2 216-218, B1-B2 220-222 on hardware configuration setting Y 204 by typing in one or more command lines or clicking another icon (e.g., Test List Y) representing this second group of tests A-B 212-214. Using this technique, a total of eight tests (both tests A-B 212-214 four times each in test list X 208 and Y 210) are run by merely two execution initiations representing the two test lists 208-210.

In one embodiment, a user may choose to group any number of tests with any number of hardware and/or software configuration settings, in advance, by using the script (or GUI-based) representation 228. In generating groups or lists of tests, such as test lists X-Y 208-210, the user may use any other relevant testing data (e.g., previous tests, test history, test statistics, previous configuration settings, etc.) of, for example, previously run tests of the current software component that is being tested or other components (including older versions of the current component) by accessing the testing information on database 226 through script representation 228.

In another embodiment, the user may access and analyze certain (old and/or new) relevant testing information stored at database 226 during running of a relevant test (e.g., running tests J and Q or a standalone running of test A 212 or the like), such as through test result logic of other logic/modules 234, and decide to form groups of tests in runtime, such as while running the relevant test and without stopping any other tests from running or pausing the test system itself. In one embodiment, test result logic of other logic/modules 234 accesses and retrieves the relevant information from database 226 which the user reviews and analyzes to decide whether to generate any groups or lists of tests and, if yes, whether to generate them in runtime or upon conclusion of the current running test(s). Using the illustrated embodiment, let us suppose test A 212 is running with software configuration setting A1 216 using hardware configuration setting X 202. During the running of test A 212, the user reviews and analyzes some relevant testing information (e.g., prior history or analysis of this and/or other relevant tests and components) and decides to add another software configuration setting A2 218 to test A 212, in runtime, by accessing and using script (GUI-based) representation 228 to draft this new scenario, i.e., adding a second software configuration setting 218 to test A 212. Regarding this second configuration setting 218, it may have been generated in advance (such as in anticipation of associating it to test A 212) or in runtime after reviewing the relevant testing information. As aforementioned, the user may utilize the script representation (or GUI-based representation) 228 to generate groups of tests and initiate their execution. Furthermore, a group of lists of tests may be created for a single run or multiple runs, as necessitated or desired.

This grouping of tests and their group of execution significantly reduces the number of times the user has to initiate the running of tests with multiple hardware and/or software configuration settings. Referring back to the illustrated embodiment, without the benefit of test list entity 114, the user would have had to initiate the two tests A-B 212-214 at least eight times corresponding to the number of software configuration settings 216-222. For brevity and simplicity, merely two tests A-B 212-214 based on four software configuration settings A1-A2 216-218, B1-B2 220-222 and further based on two hardware configuration settings X-Y 202-204 are illustrated, but it is contemplated that a real-life testing scenario can be of far greater complexity, which further highlights the benefit of employing test list entity 114.

Figure 2B:
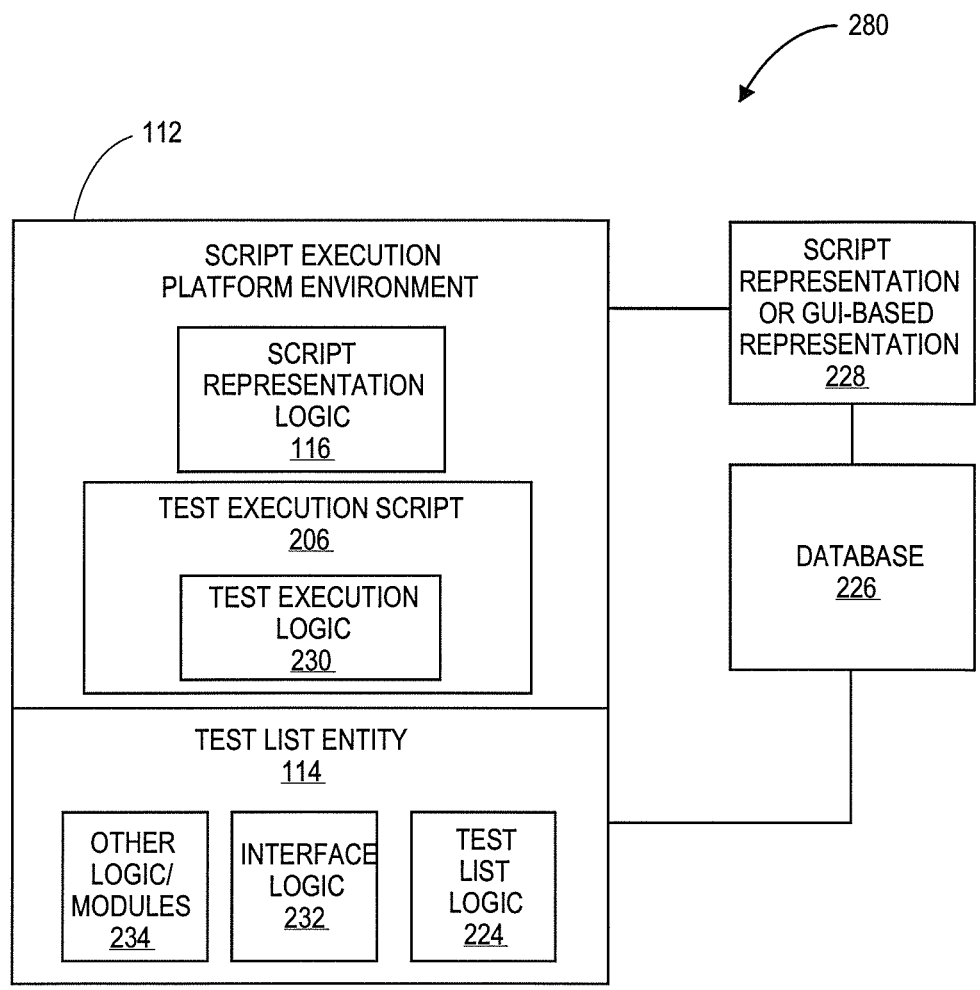
FIG. 2B illustrates a system employing a test list entity for performing dynamic software testing based on grouping of tests using a test list entity according to one embodiment of the invention.

FIG. 2B illustrates a system 280 employing a test list entity 114 for performing dynamic software testing based on grouping of tests using a test list entity 114 according to one embodiment of the invention. This illustration is a simplified block diagram of system 280 employing test list entity 114 and other relevant components to perform various tasks as discussed in FIG. 2A. System 280 (e.g., host machine including server computer system and/or client computer system) running on a standard operating system (e.g., Linux, Windows, etc.), includes a script execution platform or environment 112 (e.g., PowerShell platform), built on a software framework (e.g., .NET Framework), supporting a test execution script 206 (e.g., PowerShell script). Script execution platform 112 includes script representation logic 116 to provide a script representation of testing information (e.g., test scripts, test history, test statics, hardware and/or configuration settings, etc.) for the user to access, analyze, and manipulate. Script representation 228 is provided via a host machine that includes a server machine and/or a client machine (e.g., client device). In one embodiment, testing and other relevant information are provided using a GUI-based representation (as opposed to script representation 228) and GUI-based logic (as opposed to script representation logic 116).

Script execution script includes test execution logic 220 to facilitate execution of tests. Test result entity 114 includes other logic and modules 224 including test entity invocation logic that works in communication with test execution logic 220 to execute tests (such as by having test entity invocation logic referencing test execution logic 220) regardless of changes (including runtime modifications) made to software and/or hardware configuration settings. Other logic or modules 224 may include test list logic for performing listing or grouping of tests, etc. Interface logic 222 enables test entity to provide a user interface to script representation (or GUI-like representation) and further provide a data interface to database 226 that stores testing information.

Test list entity 114 facilitates and recognizes grouping or listing of various tests and their multiple hardware and/or software configuration settings. As mentioned with regard to FIG. 2A, a user may use script representation 228 (via a user interface, a display device) to generate one or more groups of tests either in advance or in runtime. Test list entity 114 in recognizing groups of tests, and upon initiation of the execution of these groups of tests, having its test list logic 224 enable test entity invocation logic of other logic/modules 234 to reference test execution logic 230 to perform execution of these groups of tests, such as running the tests in groups as formed by the user. These tests can be run consecutively or concurrently as defined by the user. Testing information as well as results obtained from execution of groups of tests may be provided via script representation (or GUI-based representation) 228 as provided using script representation logic 116.

Test list entity 114 provides, via test entity invocation logic of other logic/modules 234 referencing test execution logic 230, test execution script 206 the ability to run tests in groups and not only in accordance with their initial configuration settings, but also based on their modified configuration settings (if any) in runtime. In one embodiment, an abstraction layer for test list entity 114 is achieved by providing a "setup" argument in an execution constructor of test execution logic 230. Test list entity 114 may have a number of execution overloads. The setup parameter of test list entity 114 is an execution parameter that represents different physical devices (which may have different hardware profiles) on which the test execution script 206 is executed. Test list entity 114 does not include an execution script; rather, it references the test execution script 206, while the test execution script 206 acts as a black-box so script changes do not influence test list entity 114. In one embodiment, other logic/modules 224 include test entity invocation logic that references the test execution logic 220 to (re)run groups of tests by dictating the tests' groupings (or listings) as well as their new and modified (hardware and/or software) configuration settings to the test execution logic 230 through command-line arguments or configuration objects.

Modifying or using different hardware configuration settings could be of any nature, such as two computer systems having different processors (e.g., using a 1 GHz processor as opposed to using a 2 GHz processor), memory sizes (e.g., using a 256 MB Random Access Memory (RAM) as opposed to using a 512 MB RAM), etc. Examples of modifying or using different software configuration settings may include changing or modifying any number of software components of the product being tested or other software applications running on the host machine, changing virtual machine speed, number of virtual machines in iteration, using different operating systems for the same test, etc.

Test list entity 114 further includes interface logic 222 to provide a user interface to script representation 228 and a database interface to database 226. Database 226 may include relevant test information, such as tests scripts of previously-run tests of other components or previous version of the current component that is being currently tested, test history, test statistics based on test history, previous hardware and/or software configuration settings, etc.

Software testing involving test list entity 114 includes software testing of any nature, such as ranging from testing modules and components of a software application to testing complex and large-scale benchmarks, network scalability, internal releases of products (e.g., software package), antivirus scan loading, time drifting, user performance-related components, etc. Further, these tests can be performed for any number of reasons, such as investigating performance issues, performing load/stress testing, investigating regression issues relating to different product versions, etc. As an example, these testing techniques can be used to test a number of aspects of Red Hat Enterprise Virtualization (RHEV) products.

Figure 3A:
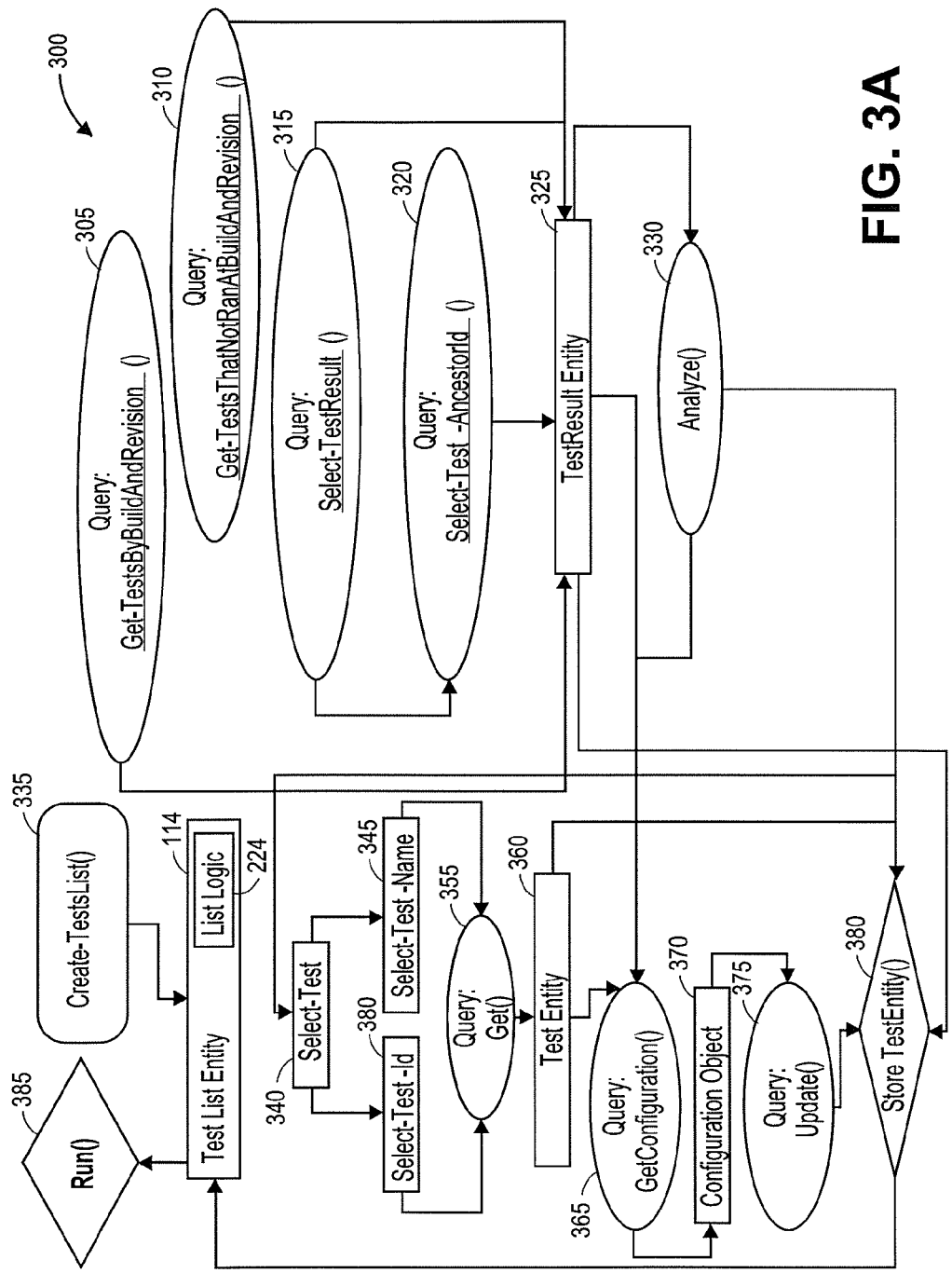
FIG. 3A illustrates a method for performing dynamic software testing based on grouping of tests using a test list entity according to one embodiment of the invention.

FIG. 3A illustrates a method for performing dynamic software testing based on grouping of tests using a test list entity 114 according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by test list entity 114 of FIG. 1.

Method 300 begins at block 305 with the querying tests by build and revision. The term "build" is a software term that relates to interval releases or versions of a product before the product is released to the public, while the term "revision" is refers to the changes or revisions made to the build; for example, each build may have a couple of revisions. At block 310, a query is performed for those tests that are not build and revision, such as a test that did not run on a previous version of the product and is limited to its current version. At block 315, previous test results are queried from a database. For example, test results of a previously-run test that is relevant to or the same as the ones requested in block 305 and 310 is requested. At block 320, the ancestor identification for the requested previously-run test is selected.

A runtime access and retrieval of relevant test information (e.g., including test results, actual tests, historical test statistics, properties, and configuration settings, etc.) from a database may be performed using another logic 325, such as test result logic of other logic and modules referenced throughout this document, which may be separate logic of test list entity 114 or integrated within a single logic also having test entity invocation logic and test list logic 224. The results are then analyzed at block 330. A user may access the results through a script or GUI-based representation on a display device via a user interface. The user read, study, review, and analyze the results and then, based on the findings of these analysis perform a range of decisions. For example, in one embodiment, based on relevant testing information showing an inhering problem with a particular component of the current version of the product that is being tested, the user may choose to modify the software or hardware configuration or a particular logic of the component to achieve favorable testing results. In another embodiment, the user may use the analysis to rerun previous tests of previous versions of the current component (that is being tested) to troubleshoot the current components. For example, if the rerunning of the previous tests of the previous version is successful, the user may obtain a clue from those tests to improve results of the current test being performed to test the current component (since the current component is merely the latest version of the same components). If, for example, the user decides, based on the analysis of the relevant testing information, to modify software and/or hardware configuration settings, they are modified, at block 365, as represented by configuration object 370. The modified configuration settings are then saved at block 380 and the current hardware/software configuration settings are updated, accordingly, at block 375.

In one embodiment, one or more test groups or lists are created as predetermined by the user (e.g., software developer) at block 335 or generated, in runtime, as determined, for example, in light of the analyzed results at block 330. If a group of tests is generated in runtime, it goes through the process of test selection (blocks 340-355) through test entity invocation logic 360 (e.g., test entity) and software and/or hardware configuration setting modification (block 365-380). Either way, once a group or a number of groups have been created, they are executed by enabling the test execution script to run the tests that are represented by these groups (according to their corresponding properties and hardware/software configuration settings) at block 385. As aforementioned, the user may simply initiate the group test using a script representation (e.g., type in a command line) using a GUI-based representation (e.g., click an icon on the screen) to initiate the execution of these groups of tests.

FIG. 3B illustrates a transaction sequence for performing dynamic software testing based on grouping of tests using a test list entity according to one embodiment of the invention. At block 388, which parallels block 335 of FIG. 3A, a group or list of tests is created by an exemplary name of "Benchmark_Windows" using the cmdlet "Create-TestList" in a test execution script, such as the PowerShell script. At blocks 390 and 392, tests are added to the group. In block 390, an array of tests is added to the list using a default configuration setting. RunOnce configuration is used when default configuration is retrieved, modified and passed to List/Test execution interface (of test list entity) as in block 392 (e.g., this configuration is to be used only once); otherwise, use default configuration as in block 390. For example, if (configuration retrieved+modified and then passed to List/Test execution interface): used "RunOnce" execution [configuration is NOT persistent] else-if: (configuration retrieved+modified+called $conf.update( )), conf is saved and so called "default configuration" else-if: ($test executed/added to list with no configuration specified), used "default configuration" [which is persistent]. In block 392, however, test are being created and added to the group with modifying configuration settings (see point number 4) and these tests are added without RunOnce configuration so that these tests can run multiple times with various hardware/software configuration settings. In this case, the modification of the configuration setting and the adding of the test to the group are being performed in runtime.

At block 394, paralleling block 385 of FIG. 3A, illustrates various test list entity execution interfaces. Test list entity provides the necessary ability to the test execution script to run these tests (within the group) back-to-back according to the properties and configuration settings as set forth in the test execution script. At block 396, the results of the group tests are retrieved for analysis and further decision-making, while at block 398, the tests themselves are retrieved.

Figure 4:
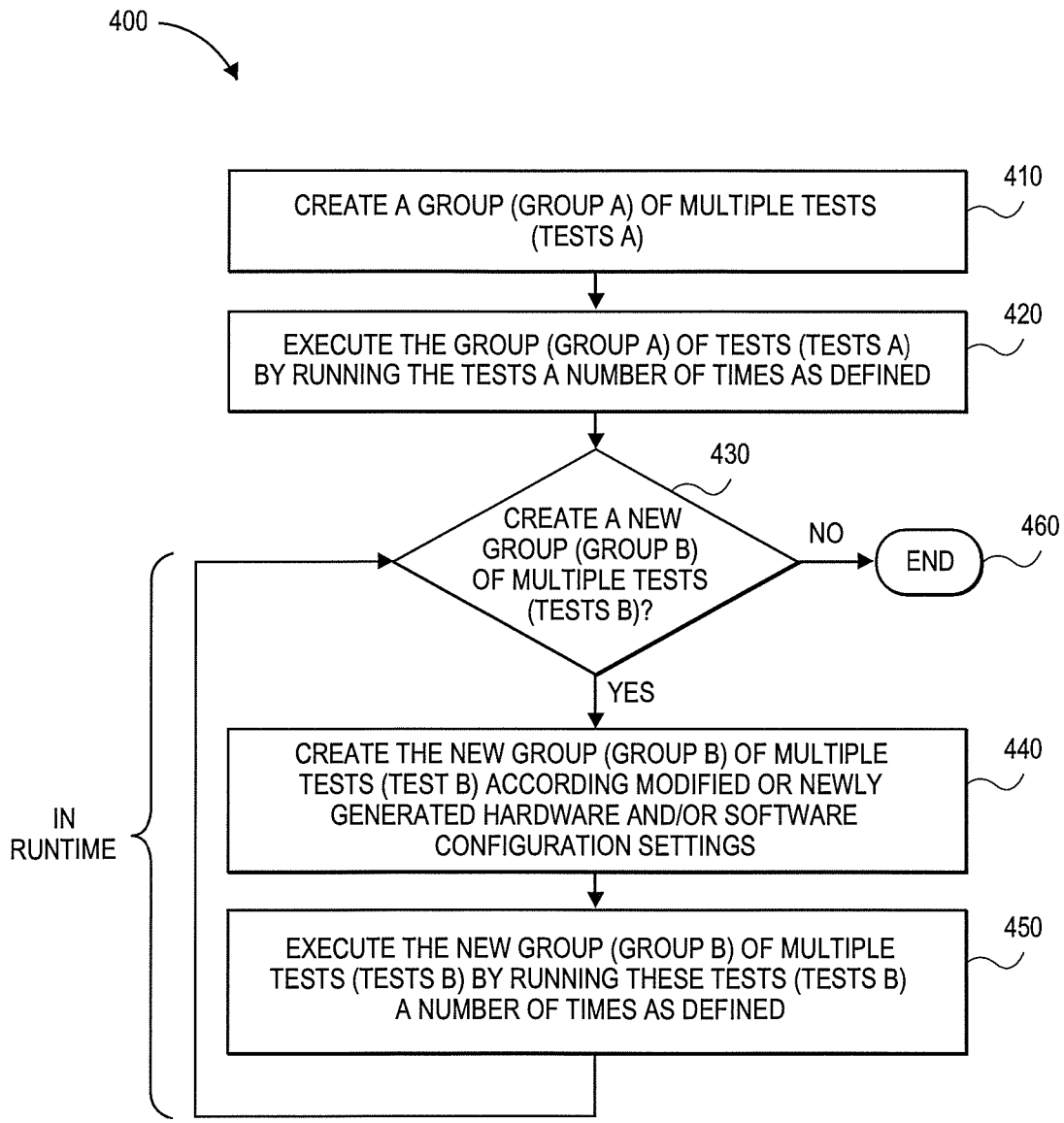
FIG. 4 illustrates a method for performing dynamic software testing based on grouping of tests using a test list entity according to one embodiment of the invention.

FIG. 4 illustrates a method for performing dynamic software testing based on grouping of tests using a test list entity 114 according to one embodiment of the invention. Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by test list entity of FIG. 1.

Method 400 begins at block 410 where a group (group A) of multiple tests (tests A) is generated. Group A is predetermined and generated based on the information already available to a user. At block 420, group A is executed. The execution of group A means running of tests A. This execution of group A may be initiated by the user by, in one embodiment, typing in one or more command lines using a script representation, or by, in another embodiment, clicking on an appropriate group icon using a GUI-like representation and upon that initiation, the test list entity enables the test execution script to run each of tests A according to their properties and hardware and/or software configuration settings as defined in the test execution script. Each of the first tests runs as many times as defined in its corresponding properties.

In runtime, at block 430, a determination is made as to whether another group (group B) of tests (tests B) be created. The decision may be based on a combination of already available information and new testing information (such as results or progress of tests A of group A, historical statistics of these or other relevant tests, etc.). If group B is not to be created, the testing process may end upon completion of the execution of group A at block 460; otherwise, group B is generated and populated with tests B, in runtime, at block 440. Group B may be populated with any number of new tests with new configuration settings, new tests with some or all of old configuration settings (such as the ones from group A), some or all of old tests (such as tests A) with some or all of new configuration settings, and any combination thereof. Group B is executed at block 450. Group B's execution includes test list entity enabling the test execution script to run tests B as set forth in group B and according to their properties and configuration setting as defined using the test execution script. As with the first tests, the test execution script is enabled by the test list entity to the second tests according to their corresponding properties and configuration settings. This group generation and testing process continues with block 430.

Figure 5:
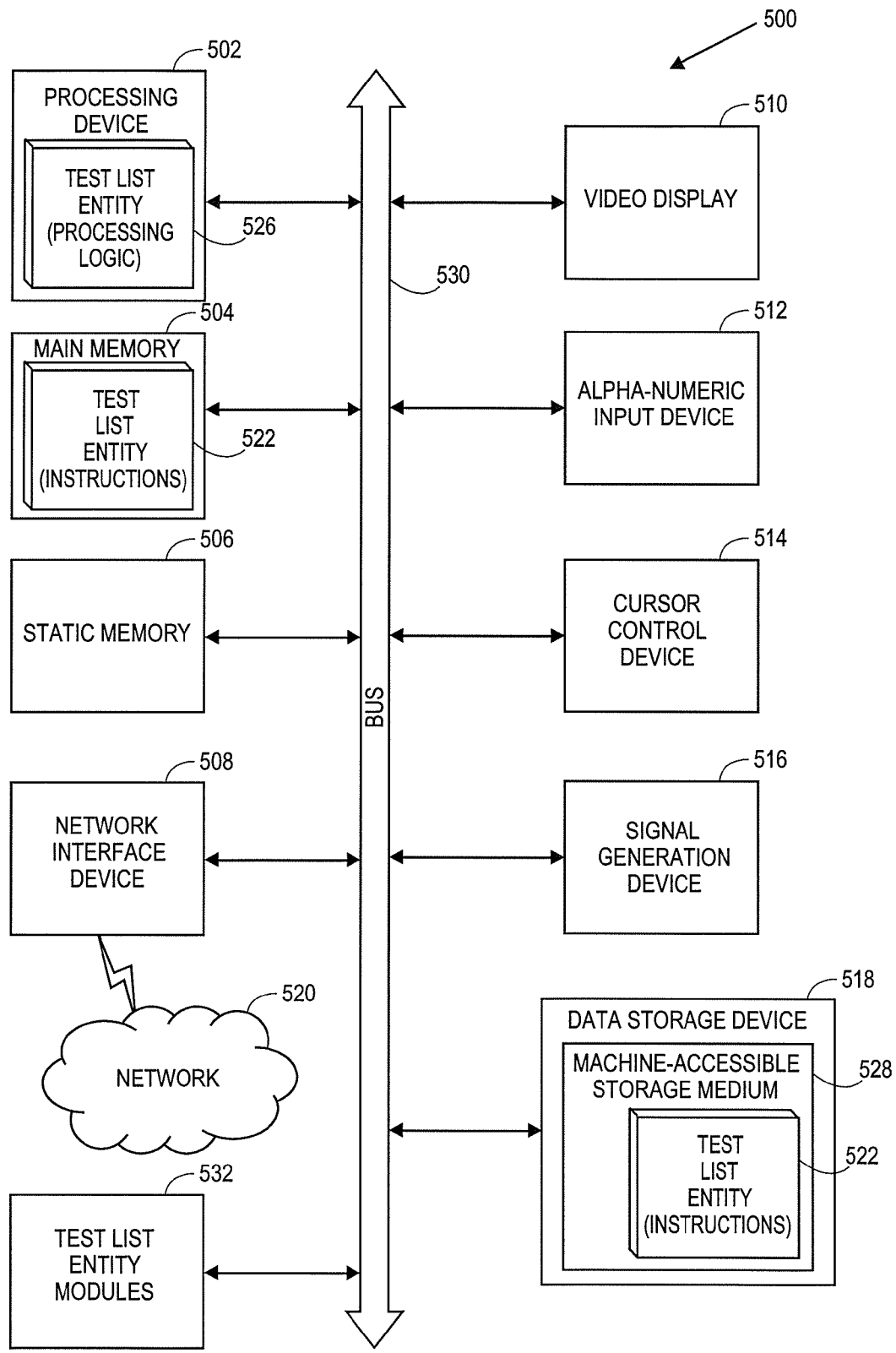
FIG. 5 is a block diagram illustrating one embodiment of a computer system.

FIG. 5 is a block diagram of a computer system 500 for performing dynamic software testing based on grouping of tests using a test list entity according to one embodiment of the invention. Within the computer system 500 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, random access memory (RAM), dynamic RAM (DRAM) such as synchronous DRAM (SDRAM), DRAM (RDRAM), etc.), a static memory 506 (e.g., flash memory, static random access memory (SRAM), etc.), and a secondary memory 518 (e.g., a data storage device in the form of a drive unit, which may include fixed or removable machine-accessible or computer-readable storage medium), which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic 526 for performing the operations and methods discussed herein.

The computer system 500 may further include a network interface device 508. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 516 (e.g., a speaker).

The data storage device 518 may include a machine-accessible storage medium (or a computer-readable storage medium) 528 on which is stored one or more sets of instructions 522 (e.g., test list entity) embodying any one or more of the methodologies or functions described herein. The test list entity may also reside, completely or at least partially, within the main memory 504 (e.g., test list entity (instructions) 522) and/or within the processing device 502 (e.g., test list entity (processing logic) 526) during execution thereof by the computer system 500, the main memory 504 and the processing device 502 also constituting machine-readable storage media. Further, for example, the test list entity instructions 522 may be transmitted or received over a network 520 via the network interface device 508.

The machine-readable storage medium 528 may also be used to store the test list entity (instructions) 522 persistently. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Test list entity modules 532, components and other features described herein (for example in relation to FIG. 1) can be implemented as discrete hardware components or integrated in the functionality of hardware components such as ASICS, FPGAs, DSPs or similar devices. In addition, the modules 532 can be implemented as firmware or functional circuitry within hardware devices. Further, the modules 532 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "creating", "executing", "selecting", "querying", "enabling", "storing", "saving", "running", "rerunning", "determining", "selecting", "modifying", "performing", "analyzing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
   enabling, by a processing device of a computer system, a first test execution script to execute, on a test execution platform of the computer system, a first group of first tests in view of a first set of hardware configuration settings, wherein each of the first tests comprise different software configurations tested on the same first set of hardware configuration settings during the runtime of the first test execution script, wherein the different software configurations comprise at least one of components of a product being tested, other software applications running on the computer system, virtual machine speed, number of virtual machines in iteration, or operating system for the first tests;
   receiving, in runtime, script representations of a second group of second tests generated, without user interaction, in view of one or more of first results of the first tests or historical statistics of previously-run tests that are relevant to the first tests, wherein the second group of second tests are tested on a second set of hardware configuration settings that is different from the first set of hardware configuration settings, wherein each of the second tests comprise different software configurations;
   generating, in runtime, a second test execution script from the received script representations;
   enabling, in runtime, the second test execution script to execute, on the test execution platform, the second group of second tests in view of the second set of hardware configuration settings, wherein the different software configurations of the second tests are tested on the same second set of hardware configuration settings during the runtime of the second test execution script.

2. The method of claim 1, further comprising modifying, in runtime, the second set of hardware configuration settings.

3. The method of claim 2, further comprising causing execution of a modified second group of second tests according to the modified second set of hardware configuration settings, wherein executing the modified second group of second tests comprises enabling the test execution script to switch, in runtime, from the second set of hardware configuration settings to the modified second set of hardware configuration settings.

4. The method of claim 2, wherein the second set of hardware configuration settings is modified based on the first results or second results of the second tests.

5. The method of claim 1, wherein the first and second tests are run to test software components.

6. A system comprising:
   a memory;
   a processing device communicably coupled to the memory of a computer system;
   a script execution environment executable from the memory by the processing device, the script execution environment comprising a test execution script;
   a test list entity communicably coupled to the memory, the processing device, and the script execution environment, wherein the test list entity is to:
      enable a first test execution script to execute, on a test execution platform of the computer system, a first group of first tests in view of a first set of hardware configuration settings, wherein each of the first tests comprise different software configurations tested on the same first set of hardware configuration settings during the runtime of the first test execution script, wherein the different software configurations comprise at least one of components of a product being tested, other software applications running on the computer system, virtual machine speed, number of virtual machines in iteration, or operating system for the first tests;
      receive, in runtime, script representations of a second group of second tests generated, without user interaction, in view of one or more of first results of the first tests or historical statistics of previously-run tests that are relevant to the first tests, wherein the second group of second tests are tested on a second set of hardware configuration settings that is different from the first set of hardware configuration settings, wherein each of the second tests comprise different software configurations;
      generate, in runtime, a second test execution script from the received script representations;
      enable, in runtime, the second test execution script to execute, on the test execution platform, the second group of second tests in view of the second set of hardware configuration settings, wherein the different software configurations of the second tests are tested on the same second set of hardware configuration settings during the runtime of the second test execution script.

7. The system of claim 6, wherein the test list entity is further to cause execution of a modified second group of second tests according to a modified second set of hardware configuration settings, wherein executing the modified second group of second tests comprises enabling the test execution script to switch, in runtime, from the second set of hardware configuration settings to the modified second set of hardware configuration settings.

8. The system of claim 7, wherein the second set of hardware configuration settings is modified based on the first results or second results of the second tests.

9. The system of claim 6, wherein the first and second tests are run to test software components.

10. A non-transitory machine-readable storage medium including instructions that, when accessed by a processing device, cause the processing device to perform operations comprising:

enabling, by the processing device, a first test execution script to execute, on a test execution platform of the computer system, a first group of first tests in view of a first set of hardware configuration settings, wherein each of the first tests comprise different software configurations tested on the same first set of hardware configuration settings during the runtime of the first test execution script, wherein the different software configurations comprise at least one of components of a product being tested, other software applications running on the computer system, virtual machine speed, number of virtual machines in iteration, or operating system for the first tests;

receiving, in runtime, script representations of a second group of second tests generated, without user interaction, in view of one or more of first results of the first tests or historical statistics of previously-run tests that are relevant to the first tests, wherein the second group of second tests are tested on a second set of hardware configuration settings that is different from the first set of hardware configuration settings, wherein each of the second tests comprise different software configurations;

generating, in runtime, a second test execution script from the received script representations;

enabling, in runtime, the second test execution script to execute, on the test execution platform, the second group of second tests in view of the second set of hardware configuration settings, wherein the different software configurations of the second tests are tested on the same second set of hardware configuration settings during the runtime of the second test execution script.

11. The non-transitory machine-readable storage medium of claim 10, further having instructions that, when executed, cause the processing device to modify, in runtime, the second set of hardware configuration settings.

12. The non-transitory machine-readable storage medium of claim 11, further having instructions that, when executed, cause the processing device to cause execution of a modified second group of second tests according to the modified second set of hardware configuration settings, wherein executing the modified second group of second tests comprises enabling the test execution script to switch, in runtime, from the second set of hardware configuration settings to the modified second set of hardware configuration settings.

13. The non-transitory machine-readable storage medium of claim 11, wherein the second set of hardware configuration settings is modified based on the first results or second results of the second tests.

14. The non-transitory machine-readable storage medium of claim 11, wherein the first and second tests are run to test software components.

* * * * *